United States Patent [19]
Phipps

[11] Patent Number: 5,832,896
[45] Date of Patent: Nov. 10, 1998

[54] GOVERNOR AND CONTROL SYSTEM FOR INTERNAL COMBUSTION ENGINES

[75] Inventor: Jack R. Phipps, Bristol, Tenn.

[73] Assignee: Zenith Fuel Systems, Inc., Bristol, Va.

[21] Appl. No.: 780,932

[22] Filed: Jan. 9, 1997

Related U.S. Application Data

[63] Continuation-in-part of Ser. No. 529,599, Sep. 18, 1995, abandoned.

[51] Int. Cl.$^6$ .............................. F02D 9/08; F02D 43/00; F02D 41/14; F02M 25/07
[52] U.S. Cl. ......................... 123/352; 123/361; 123/478; 123/571; 123/687
[58] Field of Search .................................... 123/352, 361, 123/399, 478, 571, 687

[56] References Cited

U.S. PATENT DOCUMENTS

| | | | |
|---|---|---|---|
| 4,168,679 | 9/1979 | Ikeura et al. | 123/399 X |
| 4,237,830 | 12/1980 | Stivender | 123/399 X |
| 4,335,695 | 6/1982 | Phipps | 123/478 |
| 4,418,673 | 12/1983 | Tominari et al. | 123/399 X |
| 4,471,741 | 9/1984 | Asik et al. | 123/399 |
| 4,476,532 | 10/1984 | Akiyama et al. | 123/571 X |
| 4,524,745 | 6/1985 | Tominari et al. | 123/399 X |
| 4,552,116 | 11/1985 | Kuroiwa et al. | 123/478 X |
| 4,671,235 | 6/1987 | Hosaka | 123/352 |
| 5,002,031 | 3/1991 | Kako | 123/571 X |
| 5,558,062 | 9/1996 | DeMinco et al. | 123/361 |

OTHER PUBLICATIONS

"Engine Control System Sensitivity", James H. Rillings, General Motors Research Labs, GM Technical Center, pp. 33–44.

"A Linearized Model of Engine Torque and Carbon Monoxide Emissions", Man–Feng Chang and Jeffrey A. Sell, General Motors Research Labs, pp. 41–52.

*Primary Examiner*—Tony M. Argenbright
*Attorney, Agent, or Firm*—Wells, St. John, Roberts, Gregory & Matkin, P.S.

[57] ABSTRACT

A speed governing system for an internal combustion engine includes an internal combustion engine having an inlet manifold, an exhaust manifold, and at least one variable volume combustion chamber disposed therebetween. The apparatus also includes a fuel and air delivery control system having an air delivery mechanism responsive to a sensor control signal for affecting engine operation, a fuel delivery mechanism responsive to input from an operator for affecting engine operation, and a sensor responsive to engine operating conditions for supplying the sensor control signal. The apparatus also has an exhaust gas recirculation system including an exhaust gas recirculation conduit and an exhaust gas recirculation control valve, the control valve being controllably regulated in response to the sensor control signal in order to adjust air/fuel ratio. A method for governing operating speed of an internal combustion engine is also disclosed.

17 Claims, 4 Drawing Sheets

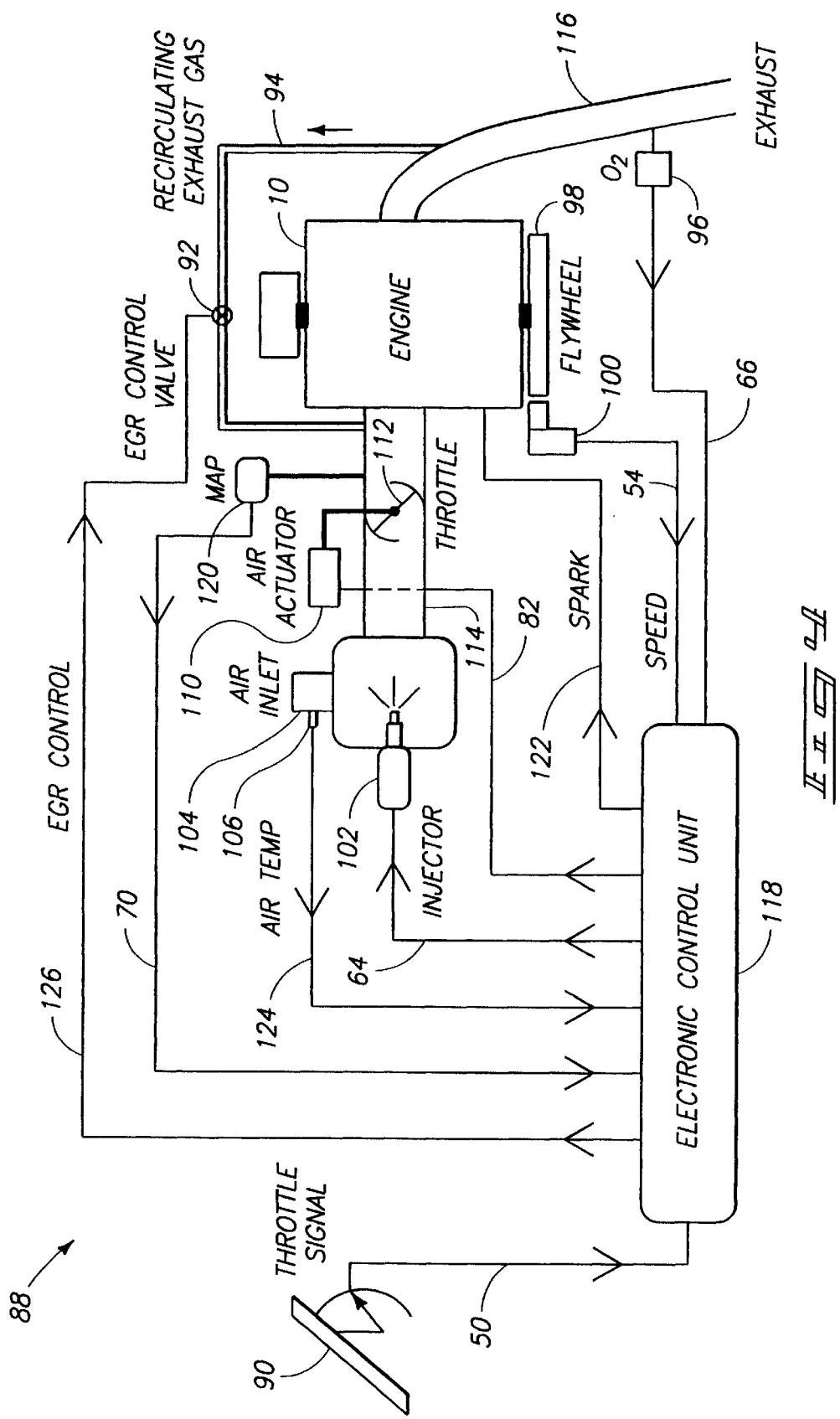

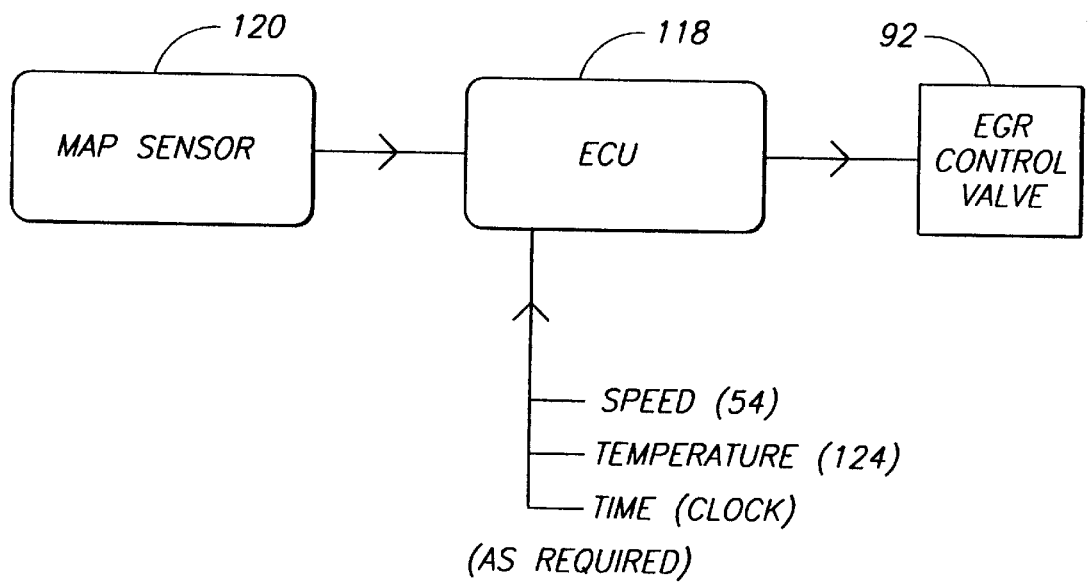

GOVERNOR AND CONTROL SYSTEM FOR INTERNAL COMBUSTION ENGINES

RELATED APPLICATION

This application is a continuation-in-part of U.S. application Ser. No. 08/529,599, filed Sep. 18, 1995, now abandoned.

TECHNICAL FIELD

This invention relates to fuel control systems and more particularly to a governor and a control system for governing speed and emission control of an engine.

BACKGROUND OF THE INVENTION

In a conventional spark-ignited engine having an electronic fuel control system including an electronic governor, the governor controls the air throttle and the electronic control system makes adjustments to the fuel being delivered to the engine in order to adjust the air/fuel mixture ratio. Typically, spark-ignited engines used in road vehicles are operated in a closed-loop mode wherein the mixture ratio of fuel and air is held very near the chemically correct, or stoichiometric, point. Preferably, the mixture ratio is held as close as possible to the stoichiometric point in order to control emissions, usually in conjunction with utilization of so-called three-way catalysts. The catalysts function to oxidize unburned hydrocarbons and carbon monoxide, as well as to reduce oxides of nitrogen as they pass through the catalyst bed.

In this manner, a typical spark-ignition engine is operated as a closed-loop system wherein an oxygen sensor monitors the content of oxygen in the exhaust gases which is used for feed-back purposes. The typical oxygen sensor has a somewhat binary output, generally operating more or less as a switch when utilized with stoichiometric mixtures. However, the switching-type action of an oxygen sensor requires that at least a small amount of "dither" be allowed during engine operation, otherwise there will be no direct way of discerning how far an operating engine has deviated from the ideal point of stoichiometry. The dither provides a small perturbation about a desired, or idealized operating condition. In operation, a feed-back system with an oxygen sensor of this construction acts more or less as a "bang-bang" loop. Essentially, the control signal value has a magnitude that changes polarity in order to drive the system about a desired ideal operating point; namely, the ideal point of stoichiometry.

In a conventional spark ignition engine having an oxygen feedback loop, the dither or small perturbations occur as a result of changes in the quantity of fuel delivered per cylinder event. As shown in FIG. 1, a typical oxygen sensor provides a binary output to a fuel injection system that increments or decrements the pulse width applied to an injector at stoichiometric mixtures pursuant to the oxygen sensor value.

When a prior art internal combustion engine according to FIG. 1 is operated with excess air, i.e. leaner than stoichiometric, the torque output from the engine is proportional to the quantity of fuel being delivered. For engines utilizing such a conventional control system, an evaluation of combustion as an instantaneous or single cylinder event reveals torque variations that result in speed variations with a constant load. In contrast, small variations in air quality between discrete cylinder events produce a relatively small effect on engine output.

Due to the above resulting torque variations and the lack of sensitivity to changes in air delivery, particularly those resulting from throttle changes, a certain degree of speed variation occurs in these engines. However, in many applications speed variations are undesirable. For example, when driving an alternating current generator with the above engine it becomes difficult, if not impossible to produce a desired constant frequency current due to the torque variations. To a limited extent, attempts have been made to filter either the oxygen sensor output, or the control system output in order to mitigate the speed variations. However, filtering slows the ability of the engine to respond to changes in load, causing a degradation in performance.

Therefore, there is a need to provide a method of controlling operation of an industrial engine, particularly for uses where speed variations must be kept to a minimum during operation. The method should provide a stable speed control, while at the same time allowing for emission control through control of the fuel/air ratio delivered to the engine.

BRIEF DESCRIPTION OF THE DRAWINGS

Preferred embodiments of the invention are described below with reference to the accompanying drawings, which are briefly described below.

FIG. 4 is a schematic diagram illustrating a governing system configured to implement the fuel control system principles of FIGS. 2 and 3; and FIG. 5 is a schematic diagram illustrating input/output signals for the electronic control unit (ECU).

DETAILED DESCRIPTION OF THE PREFERRED EMBODIMENTS

Figure 1:
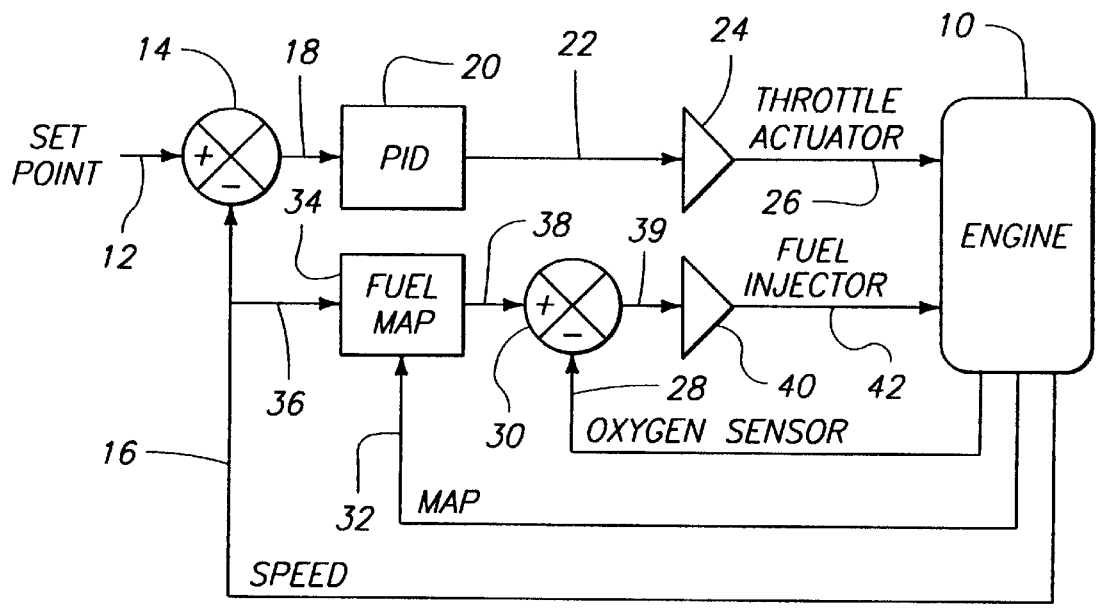
FIG. 1 is a schematic block diagram illustrating a prior art fuel control system.

This disclosure of the invention is submitted in furtherance of the constitutional purposes of the U.S. Patent Laws "to promote the progress of science and useful arts" (Article 1, Section 8).

According to one aspect of this invention, a speed governing system for an internal combustion engine includes an internal combustion engine having an inlet manifold, an exhaust manifold, and at least one variable volume combustion chamber disposed therebetween. The apparatus also includes a fuel and air delivery control system having an air delivery mechanism responsive to a sensor control signal for affecting engine operation, a fuel delivery mechanism responsive to input from an operator for affecting engine operation, and a sensor responsive to engine operating conditions for supplying the sensor control signal. The apparatus also has an exhaust gas recirculation system including an exhaust gas recirculation conduit and an exhaust gas recirculation control valve, the control valve being controllably regulated in response to the sensor control signal in order to adjust air/fuel ratio.

According to another aspect of this invention, a speed governing system for an internal combustion engine includes an electronic control unit for controlling exhaust gas recirculation, fuel delivery and air delivery to an internal combustion engine. The apparatus also includes a manifold absolute pressure (MAP) sensor configured to detect a measured intake manifold absolute pressure of the internal combustion engine and output a detected MAP signal representative of the detected manifold absolute pressure. The apparatus also has an exhaust gas recirculation control valve configured to receive a control signal from the electronic control unit, the map signal being input to the electronic control unit to control exhaust gas recirculation as a function of manifold absolute pressure.

According to yet another aspect of this invention, a method for governing operating speed of an internal combustion engine provides an internal combustion engine having an air and fuel inlet, an exhaust outlet, exhaust gas recirculation including an exhaust gas recirculation control valve for regulating exhaust gas recirculation from the exhaust outlet to the air inlet, and at least one variable volume combustion chamber disposed between the air inlet and the exhaust outlet. The apparatus also provides a fuel and air delivery control system having an air delivery mechanism cooperating with the air and fuel inlet and responsive to control signals for affecting engine operation, a fuel delivery mechanism cooperating with the air and fuel inlet and responsive to input from an operator for affecting engine operation, and a sensor responsive to engine operating conditions for supplying sensor control signals. The apparatus also detects manifold absolute pressure and controllably recirculates exhaust gases as a function of manifold absolute pressure to adjust air/fuel delivery to the engine so as to account for the recirculated exhaust gases.

Brief Description of the Prior Art

FIG. 1 is a schematic block diagram illustrating the principles of a typical fuel/air delivery system for a spark-ignited engine. Particularly, a command signal or set point representative of commanded power is generated on an input conductor 12. In most applications, the set point signal delivered on conductor 12 represents a desired power level commanded by an operator as they position a throttle pedal. Alternatively, the set point signal can be provided by an adjustable speed controller such as a knob which an operator can use to dial in a desired running speed. As shown in FIG. 1, the set point command 12 is delivered in an appropriately scaled configuration to a comparator 14. A second input provided to the comparator 14 consists of an engine speed signal which is delivered along an input conductor 16 from an engine speed sensor (not shown) on the engine 10. The signal along conductor 16 indicates the running speed of engine 10. The comparator detects a difference between a set point signal and the engine speed signal, and a corresponding error signal is generated on conductor 18 which represents the difference in desired and realized engine speed between the two input signals to the comparator 14.

The error signal carried on conductor 18 is delivered to a proportional plus integral plus derivative (PID) control system. The PID controller 20 produces an output proportional to a linear combination of the error between the input and the setpoint, the time integral of the error and the time rate-of-change of error pursuant to one or more presently understood and commercially available implementations of a PID controller that define an input and output relationship. The output of the controller 20 is then delivered along a conductor 22 to an amplifier 24 that amplifies the signal, then delivers the amplified signal along a conductor 26 to an air throttle actuator of engine 10, such as a servo-driven air inlet valve. In this manner, the amplified signal serves as an input delivered along conductor 26 to drive the throttle actuator which opens and closes the air inlet valve, or throttle, to deliver air to engine 10 during operation.

Additionally, a traditional prior art spark-ignited engine has a dual feedback circuit configured to regulate fuel delivery to engine 10. A first feedback loop is formed by conductor 28 and consists of an oxygen sensor (not shown) provided in fluid communication with exhaust gases in an exhaust manifold of engine 10 that senses the presence of oxygen and delivers an oxygen sensing signal to a comparator 30 in the form of a negative input. A second feedback loop is formed by conductor 32 and consists of a manifold absolute pressure (MAP) signal delivered along conductor 32 and originating from a MAP sensor (not shown) in pressure communication with the interior of an intake manifold of engine 10 where it is delivered to a fuel map 34. The engine speed signal is delivered along conductor 36 as an input to the fuel map 34. Preferably, the fuel map 34 is formed from a lookup table that produces an output for a given value of engine speed and manifold absolute pressure. The fuel map 34 then produces an output along conductor 38 wherein the output provides an input to comparator 30. Comparator 30 then generates an error signal 39 along conductor 39 sized in relation to the signals input along conductors 28 and 38, respectively. Error signal 39 is then amplified with a signal amplifier 40, after which it is delivered along conductor 42 to drive an electronic fuel injector of engine 10, preferably configured as a pulse-width modulated fuel injector. Hence, an amplified fuel injector signal is delivered along conductor 42 to control fuel injection into engine 10, wherein the signal is preferably delivered to the fuel injector in a pulse-width manner.

Detailed Description of the Invention and the Various Elements Thereof

Figure 2:
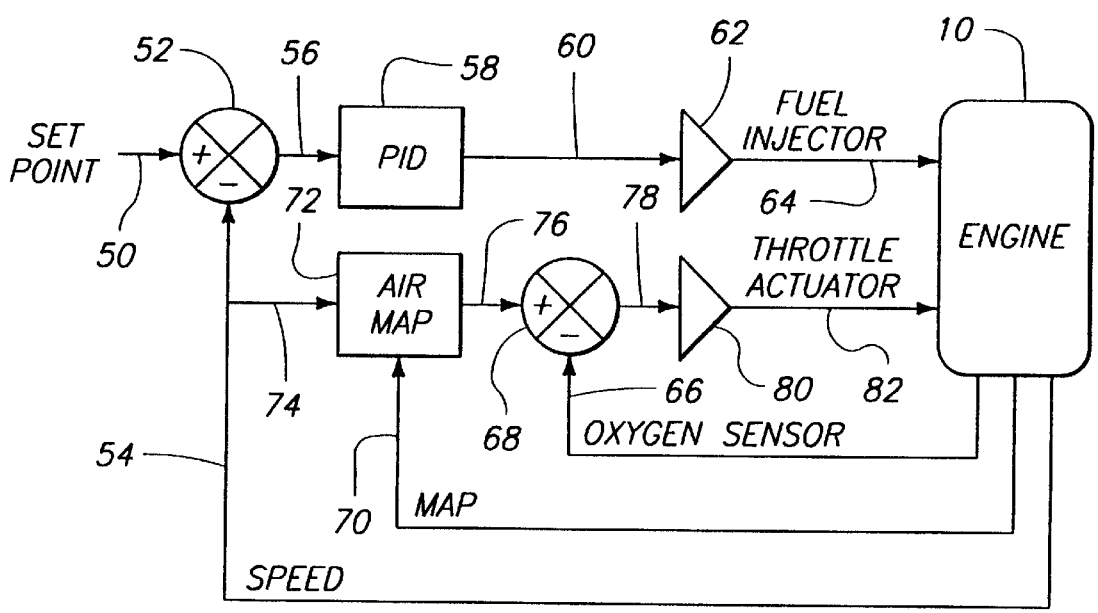
FIG. 2 is a schematic block diagram illustrating the fuel control system principles of this invention.

FIG. 2 is a schematic block diagram illustrating the control system principles for supplying air and fuel to a spark-ignited engine according to the present invention. An engine 10 receives a metered quantity of fuel, with the fuel delivery being controlled by an operator via a set point signal 50 that is input to a comparator 52. An engine speed signal is also delivered as a negative feedback that is input along conductor 54 to comparator 52. Preferably, an engine speed sensor (not shown) on engine 10 detects engine speed to produce the signal delivered along conductor 54. Consequently, comparator 52 calculates an error signal that is delivered along conductor 56 to a PID controller 58. PID controller 58 produces an output consisting of a fuel injector control signal delivered along conductor 60 to an amplifier 62. Amplifier 62 then delivers the amplified control signal along conductor 64 to a fuel injector system (not shown) of engine 10. In operation, the signal delivered along conductor 64 is adjusted in order to tailor a desired pulse-width delivery of fuel via a fuel injector (not shown) which forms an electronic fuel delivery system for engine 10.

Preferably, for the case of an industrial engine the operator control is an engine speed governor, and the governor directly manipulates the pulse width, or fuel injection quantity. Alternatively, the operator control is an operator input control such as a vehicle throttle pedal.

Air delivery to engine 10 in FIG. 2 is provided via a double-loop feedback system wherein an oxygen sensor (not shown) on engine 10 produces a detected oxygen sensor signal along conductor 66 to a comparator 68. Preferably, the sensed signal is delivered along conductor 66 as a negative feed-back to comparator 68.

A Manifold Absolute Pressure (MAP) sensor (not shown) provided on engine 10 produces a MAP signal corresponding to the absolute pressure within the engine manifold. The MAP signal is delivered along conductor 70 as an input to an air (or throttle) Map 72.

Additionally, engine speed is also delivered from conductor 54 along conductor 74 where it is input to air map 72. Air map 72, preferably configured as a look-up table, produces an output signal along conductor 76 which provides an input to comparator 68. Comparator 68 is preferably configured to compare the air map signal delivered along conductor 76 with the oxygen sensor signal delivered along conductor 66 to produce an error output signal delivered along conductor 78 to an amplifier 80. Amplifier 80 produces a corresponding amplified signal along conductor 82 of a magnitude suitable for activating and deactivating a throttle actuator (not shown) on engine 10. Preferably, the throttle actuator is a solenoid that is configured to open and close a throttle valve (not shown) on the engine in response to the delivered error output signal delivered along conductor 78. Preferably, the throttle valve and solenoid assembly are configured such that the throttle actuation signal delivered along conductor 82 activates and deactivates positioning of the throttle via the solenoid to control air delivery to the engine intake manifold.

In essence, the logical operation of the control system implemented in FIG. 2 is reversed from the exemplary conventional control system depicted in FIG. 1; namely, an operator directly manipulates the pulse-width delivery of fuel into an engine intake manifold with a fuel injector, and a servo controls air flow into the intake manifold. The servo comprises a computational system that controls the delivered air quantity. Preferably, the operator consists of an engine speed governor for applications involving industrial spark-ignited engines that need a steady running engine. Details of one such engine speed governor are disclosed below with reference to FIGS. 4 and 5.

Further additional features can be provided to the fuel and air delivery system depicted in FIG. 2. For example, certain conditions require the imposition of limits on the delivery of fuel via the fuel injector by limiting the pulse-width injection of fuel. The pulse-width injection of fuel is limited by controlling the pulse-width command signal delivered along conductor 64 to the fuel injector. The limits are imposed in order to avoid mis-fuelling of engine 10 under certain engine operating conditions. For example, an engine operating under a cold-starting condition or high altitude condition might require the placement of limitations on the pulse-width fuel injection delivery to the engine. For these cases, in order to avoid mis-fuelling while still maintaining an appropriate open-loop performance for the engine 10, a speed correction is preferably provided in order to allow for variations in volumetric efficiency of the engine. For example, during cold start conditions there is a time duration during which the oxygen sensor must first heat up sufficiently before it begins proper operation. Additionally, in some cases it is also necessary to allow for departures from ideal volumetric efficiency due to throttling conditions, thereby requiring such an implementation to avoid mis-fuelling.

In operation, fuel is injected into an engine such as engine 10 at a constant delivery rate, and the duration of fuel delivery is carefully controlled in order to vary fuel delivery into the engine intake manifold. Hence, the activation, or "on" time of the fuel injector actuator signal delivered on conductor 60 and 64 is varied which defines a pulse-width modulated signal that controls the duration of fuel delivery via the electronic fuel injector. The resulting fuel injection quantity, or signal pulse-width, corresponds to engine torque for cases where the mixture ratio is at or below a stoichiometric point.

According to the control scheme shown in FIG. 2, the oxygen sensor control loop, consisting of conductor 66, provides a feedback signal to comparator 68 which regulates the air throttle actuator. The engine torque control, or speed sensing signal, provides a feedback signal to comparator 52, via conductor 54, which imparts a control signal that regulates the engine fuel injector (not shown). The MAP sensor control loop, consisting of conductor 70, supplies input to air map 72. The speed sensor control loop, consisting of conductor 54, also supplies input to air map 72.

As shown in FIG. 2, a diagrammatic representation illustrates the basic principles of operation for this double feedback loop implementation. However, one of ordinary skill in the art will readily recognize that many additional sensors can be added to the control system of FIG. 2 in order to improve open-loop operation for special run conditions. For example, it becomes necessary to implement open-loop operation during cold-startup and warm-up conditions. The degree of sophistication necessary in order to implement these open-loop operations varies depending on the degree of emission control required during transient operating conditions. Obviously, any of the additional implementations will have a cost impact on the implementation of the system.

In order to facilitate understanding, the simplest control system has been depicted in FIG. 2 in a manner which will tend to produce good performance and good emission control for steady-state operating conditions, while requiring very few sensors. Such a system will prove especially beneficial when implemented on an engine driven generator. In order to achieve good performance while meeting emission control and engine operation for a wide variety of engine test cycles including cold starts and warm-up operation, better open-loop control will be needed, but at the expense of adding additional sensors. However, for those conditions where the emission contribution from a cold-start or a warm-up portion of a typical operating cycle are minimal, or negligible, the simple and inexpensive open-loop control algorithm can be easily implemented with the device as illustrated in FIG. 2.

The internal combustion engine control system depicted in FIG. 2 can be implemented in several ways. In one version, the control system is implemented with sensors and components using analog signals. In another version, dedicated digital logic is utilized by each of the components. In a third version, a microprocessor is also provided wherein the PID controller 58 and the air map 72 are implemented on the microprocessor as part of a microprocessor-based control system that receives signals from both the engine and an operator to implement the feedback loops of FIG. 2. For the case of the digital logic implementation, computations can be performed using appropriate first, second, or third-order equations. Alternatively, look-up tables can be utilized, depending on the functions integrated into the controller. Examples of functions that can be readily implemented on a microprocessor-based controller include an ignition timing control, speed governing algorithms, as well as fuel control implementations. Furthermore, a variety of Exhaust Gas Recirculation (EGR) control implementations can also be incorporated into designs that utilize the control system of FIG. 2. One such implementation is discussed in reference to FIGS. 4 and 5. Such an implementation imparts additional benefits in performance pursuant to the advantages given for a governing system implemented via the control system of FIG. 2. With implementation of the system in FIG. 2, the tendency for the "air" component of the air/fuel ratio to be disturbed is minimized, with respect to engine performance, when the control system is regulating fuel directly and the servo, or computational system, is controlling the air delivery.

A further additional feature includes the incorporation of an automatic "acceleration enrichment" which can be added to the FIG. 2 control system. Automatic "acceleration enrichment" can be realized on the system of FIG. 2 by incorporating suitable time delays into the control scheme. Similarly, for so-called "single-point" injection systems where intake manifold wall-wetting can occur, similar time delays can be implemented in order to effect a leaning of the delivered fuel/air mixture provided to the engine during deceleration periods. Wall-wetting involves fuel wetting of the walls along the intake manifold. The leaning effect compensates for the increased evaporation of fuel from the manifold walls. Furthermore, the time delay can also be made temperature dependent in an effort to adjust for variations in enrichment/enleanment requirements which are a function of manifold temperature.

Finally, in determining fuel injection parameters, the establishment of an upper limit for fuel injection will be dependent on the particular fuel injector being used; namely, the injector size, as well as engine size and fuel supply pressure. Any one or more of these elements can also be varied in order to implement the system on different engines.

According to the above described control logic implementation of FIG. 2, the logic of operator control and servo control are reversed. With a conventional system, an operator manipulates the air throttle and a servo controls injector pulse width (or injection quantity). Pursuant to FIG. 2, the operator directly manipulates the pulse width, and the servo controls the air delivery. For the case of most industrial engines, the operator is an engine speed governor. However, limits must be imposed on the pulse width to avoid mis-fuelling of an engine under certain boundary conditions, such as cold-starting, operation at altitude, and the like. For example, when the engine is cold, more fuel is typically needed.

In order to avoid mis-fuelling (either overfuelling or underfuelling), yet still maintain appropriate open-loop performance, a speed correction is implemented. The speed correction allows for a variation in volumetric efficiency of the engine, and, in some cases, allows for departure from ideal volumetric efficiency due to throttling. For example, such a condition can occur following engine start up where an oxygen sensor has not heated up sufficiently to begin operation.

Figure 3:
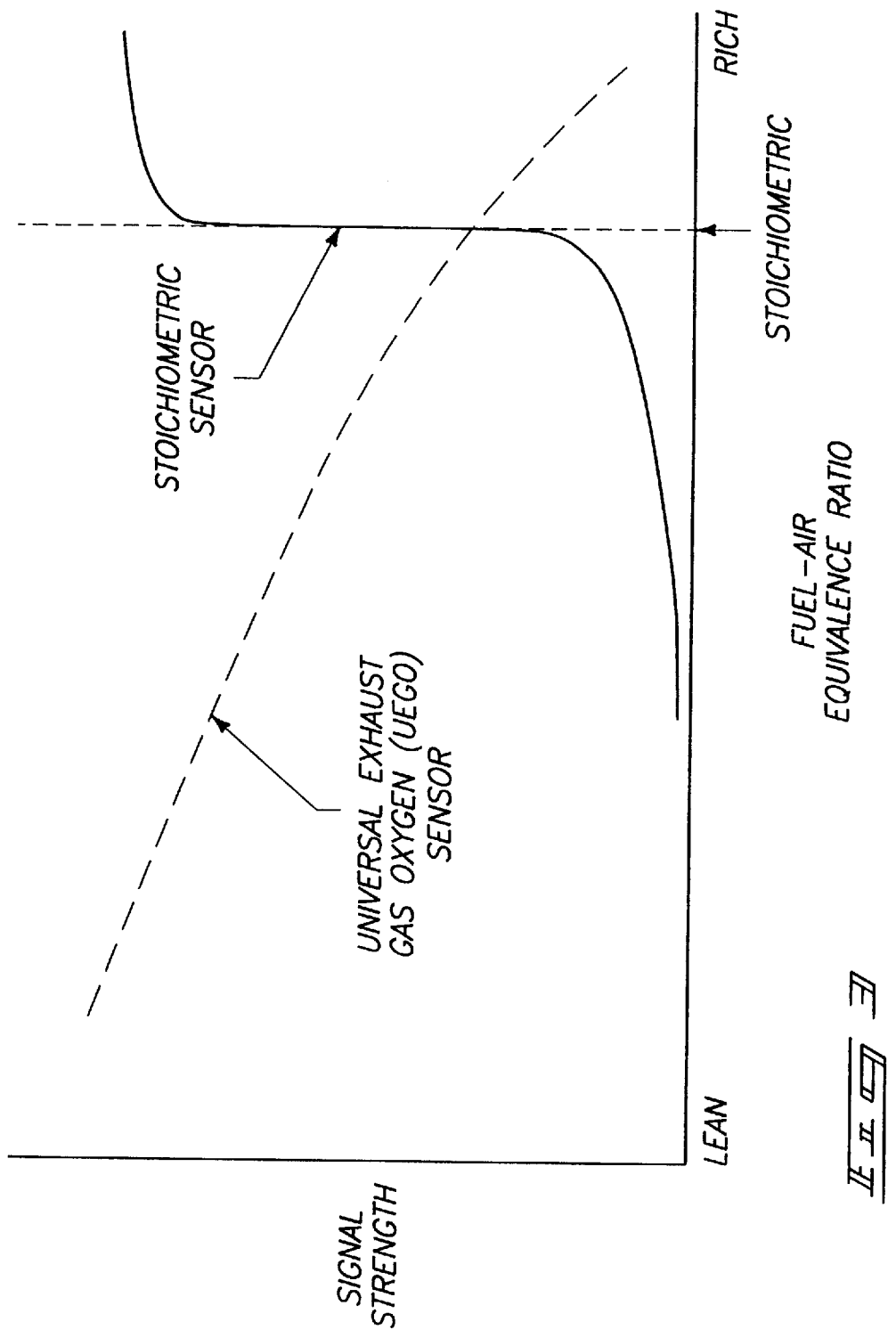
FIG. 3 is a plot of typical oxygen sensor characteristics for the system according to FIG. 2.

FIG. 3 depicts typical oxygen sensor characteristics for a stoichiometric sensor and a universal exhaust gas oxygen (UEGO) sensor. Signal strength is plotted versus a fuel-air equivalence ratio, ranging from lean to rich, with a stoichiometric point for fuel-air equivalence ratio being indicated along the abscissa. Sensing needs vary for a control system, depending on whether a steady-state operation is realized. For the simplest of systems which tend to give good performance with good emission control for steady-state operation, few sensors are required. To achieve good performance in emission control and engine operations on test cycles which include cold starts and warm-up operation, clearly better open-loop control is needed. However, for those conditions where emission contribution from the cold-start and warm-up portion of a typical operating cycle are minimal, a simple and therefore inexpensive open-loop control algorithm can be implemented.

According to the stoichiometric point in FIG. 3, the injection quantity, or pulse width, corresponds to torque of the engine so long as the mixture ratio is at or below stoichiometric. Above stoichiometric, the relationship between fuel quantity and torque is no longer linear. Here, torque is understood to refer to indicated torque, which is the output torque plus friction torque. Above stoichiometric, there is a curvature to the relationship, with a peak at the "best power" mixture ratios. The "best power" mixture ratio is somewhat engine dependent, since the excess fuel required for maximum torque at maximum air consumption depends on air distribution, fuel-air mixing, combustion quality, and other elements.

FIG. 4 illustrates in a somewhat simplified manner how exhaust gas recirculation (EGR) control can be implemented via an engine speed governor 88 that uses the control system of FIG. 2. One basic problem encountered with EGR control on a so-called "speed-density" fuel injection system operating according to the control system of FIG. 2 is that the "density" part of the calculation assumes that the measured absolute pressure is that of the incoming air. In contrast, this problem is not encountered with a more-traditional air flow sensing electronic fuel injection (EFI) system.

With respect to speed-density systems, when recirculated exhaust gas is present, the mixture of recirculated gas and injected gas/air does not have the expected amount of oxygen. Therefore, it is required to adjust the air determination to account for the EGR. If large amounts of EGR are used, a significant shift in the apparent density occurs. This shift must occur at the time the EGR begins and ends.

According to the engine speed governing system and method of FIG. 4, EGR can be controlled in an on/off fashion as a function of manifold absolute pressure (MAP). By controlling EGR as a function of manifold absolute pressure (MAP), the shift in fuel calculations is ensured to occur at the correct point according to the arrangement depicted in FIG. 4. If this was not done, the ECU logic would be required to assume the transition. Desirably, the engine speed governor 88 is not seriously affected by minor changes in the amount of EGR. However, if it is seriously affected, a more complex closed-loop system that utilizes the measurement of EGR rate can be implemented. Whether or not engine speed governor 88 is seriously affected by these minor changes in the amount of EGR, the presence or absence of EGR is almost always significant.

Although it would be possible to use direct measurement of mass air flow, more sensor(s) would be required. Hence, such a direct measurement of mass air flow would be considerably more expensive than a "speed-density" approach. Therefore, a primary beneficial purpose for using the engine speed governor 88 depicted in FIG. 4 is to produce an economical system, while still maintaining good system performance. When implementing speed governor 88, the presence of EGR can be anticipated, so shifts in the throttle position to maintain proper torque can begin early.

FIG. 4 illustrates in further detail a preferred construction engine speed governor 88 for implementing the control system of FIG. 3. Namely, set point signal 50 comprises a throttle signal delivered from a throttle 90 to an electronic control unit 118. Electronic control unit 118 is preferably configured to implement comparators 52 and 68, PID controller 58, air map 72, amplifiers 62 and 80, and signal lines 56, 60, 74, 76 and 78. Internal combustion engine 10 has an intake manifold 114 where air and fuel are received in a metered manner from an air inlet 104 and a fuel injector 102, respectively. A throttle 112 is activated by an air actuator 110 to controllably regulate the quantity of air delivered to engine 10. A temperature sensor 106 monitors temperature of inlet air received via air inlet 104. An exhaust manifold 116 of engine 10 receives combusted exhaust gases from engine 10. An oxygen sensor 96 is provided in fluid communication with exhaust manifold 116 for detecting the presence of oxygen within exhaust gases. Exhaust gases are recirculated from exhaust manifold 116 to inlet manifold 114 via an exhaust gas recirculation (EGR) conduit 94. An EGR control valve 92 regulates the delivery of exhaust gases to inlet manifold 114. A manifold absolute pressure (MAP) sensor 120 detects manifold pressure and transmits in the form of a map signal. Operating speed of engine 10 is detected by monitoring rotating speed of flywheel 98 with an engine speed sensor 100.

In addition to receiving set point signal 50, engine control unit 118 receives the detected engine speed signal 54 from speed sensor 100, a detected air temperature signal 124 from temperature sensor 106, a detected map signal 70 from map sensor 120, and a detected oxygen sensor signal 66 received from oxygen sensor 96 as shown in FIG. 4. In response to these inputs, electronic control unit (ECU) 118 outputs an EGR control signal to activate/deactivate operation of EGR control valve 92. Also, ECU 118 outputs amplified fuel injector control signal 64 to activate/deactivate fuel injector 102. Additionally, unit 118 outputs amplified throttle actuation signal 82 to activate/deactivate air actuator 110. Even further, ECU 118 outputs a spark signal 122 for activating/deactivating spark plugs (not shown) of engine 10.

FIG. 5 depicts input and output signals for ECU 118 which play a role in affecting operation of EGR control valve 92. Map sensor 120 along with engine speed 54, air temperature 124 and time (as required) are received as inputs to ECU 118. In response, ECU 118 directs controlled operation of EGR control valve 92.

The engine speed governor of FIG. 5 reverses the traditional roles of air and fuel flow control for an internal combustion engine. More particularly, the responsiveness of the engine output is, over a substantial portion of its potential operating range, much better to changes in fuel than it is to changes of air flow. Applications for such a governed engine implementation include many industrial engine applications, particularly generator sets, pumps, and other such equipment which desirably operate at a predetermined speed or set of speeds. For even more applications, it is desirable to maintain a set but adjustable (by the operator) speed without regard to load, referred to as an "all-speed" governor. With an "all-speed" governor, the governor maintains approximately the speed which is set, for example, via a foot throttle.

Another area where the reversed air/fuel flow control of the engine speed governor of FIG. 5 can be particularly useful is with low-emission industrial engines which incorporate some degree of exhaust gas recirculation (EGR) in order to meet emissions standards. In these engines, it is entirely possible that opening the air throttle will allow enough of an increase in EGR to be introduced so that power or torque may actually be reduced, rather than increased. However, the desired effect is to increase the power or torque. At best, the torque may not increase to the extent envisioned by the throttle manipulator. Therefore, serious deviations from a conventional operating governor are encountered. Such deviations make these engines very difficult to govern well.

For cases where it is desired to precisely govern an engine, for example, with the above mentioned generator set, gasoline engines are typically operated much richer than would otherwise be the case to achieve an improved responsiveness. With an air-cooled engine, this is partly due to the need to maximize cooling of the engine for adverse conditions, but largely due to the improved governing allowed by rich operation.

Pursuant to the FIGS. 4 and 5 implementation, an improved governor provides the capability of realizing lean, and consequently economical, operation. Such benefits will accrue even if EGR is used. Additionally, the improved governor will provide a stable, precise, responsive governing at stoichiometric mixtures, so that performance of the governor via a so-called three-way catalyst will be superior to conventional controls since the three-way catalyst requires very close control of mixtures at stoichiometric.

According to FIG. 5, one particularly important advantage of the control system is that the electronic control unit (ECU) has complete control over elements affecting air/fuel ratio. More particularly, the ECU has complete control over EGR. Since the ECU determines the appropriate point at which the EGR should be activated, it obviously knows whether or not EGR is present. The amount of EGR is determined by mapping the engine (since MAP, speed and air temperature are typically inputs with or without EGR), or EGR can be measured directly. For example, an orifice meter can be used to measure EGR directly.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A speed governing system for an internal combustion engine, comprising:
   an internal combustion engine having an inlet manifold, an exhaust manifold, and at least one variable volume combustion chamber disposed therebetween;
   a fuel and air delivery control system having an air delivery mechanism responsive to a sensor control signal for affecting engine operation, a fuel delivery mechanism responsive to input from an operator for affecting engine operation, and a sensor responsive to engine operating conditions for supplying the sensor control signal; and
   an exhaust gas recirculation system including an exhaust gas recirculation conduit and an exhaust gas recirculation control valve, the control valve being controllably regulated in response to the sensor control signal in order to adjust air/fuel ratio.

2. The speed governing system of claim 1 wherein the operator comprises an engine speed governor.

3. The speed governing system of claim 2 wherein the engine speed governor comprises an engine speed sensor configured to detect engine speed.

4. The speed governing system of claim 2 wherein the engine speed governor outputs a governor electronic control signal in the form of an engine speed feedback loop constructed and arranged to adjust fuel delivery to the engine relative to speed of the engine.

5. The speed governing system of claim 1 wherein the sensor comprises a manifold absolute pressure (MAP) sensor.

6. The speed governing system of claim 5 wherein the manifold absolute pressure (MAP) sensor is configured to detect a measured intake manifold absolute pressure of the internal combustion engine and output a detected manifold absolute pressure signal representative of the detected manifold absolute pressure, the manifold absolute pressure signal being input to an electronic control unit to control exhaust gas recirculation as a function of manifold absolute pressure.

7. The speed governing system of claim 1 wherein the air delivery mechanism comprises an air throttle actuator and a throttle.

8. The speed governing system of claim 1 where the fuel delivery mechanism comprises a fuel injector.

9. The speed governing system of claim 1 wherein the fuel and air delivery control system comprises an electronic control unit.

10. The speed governing system of claim 1 wherein the sensor comprises an engine speed sensor and the sensor control signal comprises an engine speed feedback loop constructed and arranged to adjust fuel delivery to the engine via the air inlet relative to speed of the engine.

11. A speed governing system for an internal combustion engine, comprising:

an electronic control unit for controlling exhaust gas recirculation, fuel delivery and air delivery to an internal combustion engine;

a manifold absolute pressure (MAP) sensor configured to detect a measured intake manifold absolute pressure of the internal combustion engine and output a detected map signal representative of the detected manifold absolute pressure; and an exhaust gas recirculation control valve configured to receive a control signal from the electronic control unit, the map signal being input to the electronic control unit to control exhaust gas recirculation as a function of manifold absolute pressure;

wherein the electronic control unit comprises a fuel and air delivery control system having an air delivery mechanism responsive to a sensor control signal for affecting engine operation, a fuel delivery mechanism responsive to input from an operator for affecting engine operation, and a sensor responsive to engine operating conditions for supplying the sensor control signal.

12. The speed governing system of claim 11 wherein the operator comprises an engine speed governor.

13. The speed governing system of claim 12 wherein the engine speed governor comprises an engine speed sensor configured to detect engine speed.

14. The speed governing system of claim 12 wherein the engine speed governor outputs a governor electronic control signal in the form of an engine speed feedback loop constructed and arranged to adjust fuel delivery to the engine relative to speed of the engine.

15. A method for governing operating speed of an internal combustion engine, comprising:

providing an internal combustion engine having an air and fuel inlet, an exhaust outlet, exhaust gas recirculation including an exhaust gas recirculation control valve for regulating exhaust gas recirculation from the exhaust outlet to the air inlet, and at least one variable volume combustion chamber disposed between the air inlet and the exhaust outlet;

providing a fuel and air delivery control system having an air delivery mechanism cooperating with the air and fuel inlet and responsive to control signals for affecting engine operation, a fuel delivery mechanism cooperating with the air and fuel inlet and responsive to input from an operator for affecting engine operation, and a sensor responsive to engine operating conditions for supplying sensor control signals;

detecting manifold absolute pressure; and controllably recirculating exhaust gases as a function of manifold absolute pressure to adjust air/fuel delivery to the engine so as to account for the recirculated exhaust gases.

16. The method of claim 15 wherein the sensor comprises a manifold absolute pressure sensor.

17. The method of claim 15 wherein the fuel and air delivery control system comprises an electronic control unit.

* * * * *